C. P. PRESNELL.
Improvement in Wheels for Vehicles.
No. 130,314.
Patented Aug. 6, 1872.
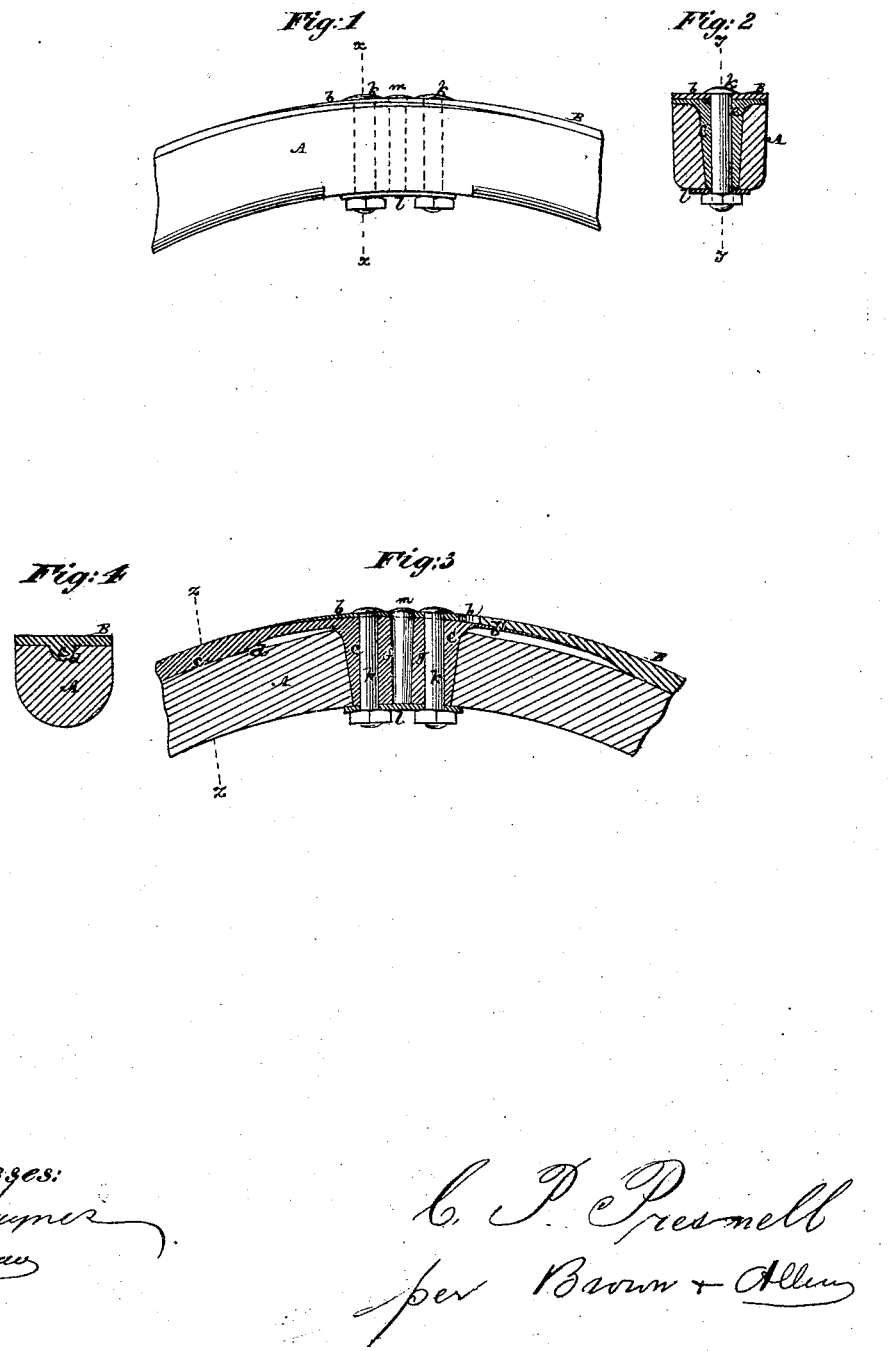

UNITED STATES PATENT OFFICE.

COMMODORE PERRY PRESNELL, OF HARTWELL, GEORGIA.

IMPROVEMENT IN WHEELS FOR VEHICLES.

Specification forming part of Letters Patent No. 130,314, dated August 6, 1872.

Specification describing an Improvement in Wheels for Wagons and other Vehicles, the invention of COMMODORE P. PRESNELL, of Hartwell, in the county of Hart and State of Georgia.

This invention relates to wheels for draft-vehicles of various kinds; and consists in a novel construction of the tire and attachment of the same to the felly of the wheel, whereby not only may the tire be firmly secured without welding and its ends be securely held together by bolts without any tendency to bind, but great facility is afforded for tightening up the tire without removing it from the wheel, and without injuring the felly.

In the accompanying drawing, which forms part of this specification, Figure 1 represents a side view or a portion of the felly of a wheel with tire attached in illustration of my improvement; Fig. 2, a section of the same at the line $x\ x$; Fig. 3, a section in transverse direction to the axis of the wheel at the line $y\ y$; and Fig. 4, a section at the line $z\ z$.

Similar letters of reference indicate corresponding parts throughout the several figures of the drawing.

A is the felly of the wheel in part, and B the tire, the two ends $b\ b'$ of which overlap one another. Said tire I prefer to form with an interior rib, $c$, extending centrally throughout the length of it, and made to fit a groove, $d$, in the felly for the purpose of giving additional strength without adding to the weight, and contributing to the lightness or neatness of appearance, and whereby other advantages are obtained. The one end, $b'$, of the tire is formed with an inner knot or protuberance, C, of less width than the felly, and arranged to project through the latter in direction of its depth. Holes $e\ f\ g$, arranged side by side in direction of the rotundity of the wheel, are made in this knot throughout its depth and that of the felly; also through the overlapping portion of the end $b$ of the tire, which portion may have a further like hole, $h$. These holes, which are not restricted as to number, are arranged at equal distances apart, or thereabout, to provide for tightening up the tire, as will be hereinafter described. Bolts $k\ k$ are passed through the holes $e\ g$ in the end $b$ of the tire, the knot C, and an inner clamp $l$, to hold the two ends of the tire firmly together without welding, and as the knot C is of the same depth as the felly an extended bearing is given to the bolts, which are made to exactly fit the holes they occupy, said knot thus keeping the bolts from bending or binding. The middle hole $f$ in the knot, and extending through the end $b$ of the tire, serves to receive a taper pin or rivet, $m$, which is inserted through the hole $f$ before the clamp $l$ is fitted to its place.

By the arrangement of the holes in the knot C and ends $b\ b'$ of the tire, as described, it is only necessary, in order to tighten up the tire, to remove the bolts $k\ k$ and the plug, pin, or rivet $m$, when, the overlapping end $b$ of the tire springing outward, a taper key or pin may be inserted in either of the three rear holes in the end $b$ and held sloping inwardly over a hole in the knot C. It is desired to draw the hole occupied by the pin in the outer end $b$ of the tire up to the key, so that by driving the said key thus set down into the hole in the knot the tire will be drawn up tight without injuring the felly or taking the tire off, and the holes in the outer end of the tire will be brought over the holes in the knot to provide for the insertion of the bolts $k\ k$ again, and rivet or plug $m$, through the newly-arranged holes in the outer end of the tire and through the knot.

By the fit of the rib $c$ of the tire in the groove $d$ of the felly other bolts than those described in the ends of the tire may be dispensed with, thus facilitating the drawing up of the tire, as explained, as well as avoiding much labor and weakening of the felly, and serving to keep the tire in its place; the knot C also contributing in many or most of these respects.

What is here claimed, and desired to be secured by Letters Patent, is—

1. The knot C on the one end, $b'$, of the tire, arranged to penetrate or project through the felly A, substantially as specified, shown, and described.

2. In combination with the knot C on the one end, $b'$, of the tire, the bolts $k\ k$ and holes $e\ f\ g$ in said knot, and $h$ in the outer end $b$ of the tire, the whole being arranged, in relation with each other and with the tire, essentially as and for the purposes herein set forth.

COMMODORE PERRY PRESNELL.

Witnesses:
LEE LINDER,
THOMAS HAYNES.